United States Patent
Takeuchi et al.

(10) Patent No.: US 11,019,232 B2
(45) Date of Patent: May 25, 2021

(54) IMAGE FORMING APPARATUS AND NON-TRANSITORY COMPUTER READABLE STORAGE MEDIUM

(71) Applicant: KYOCERA Document Solutions Inc., Osaka (JP)

(72) Inventors: Naoki Takeuchi, Osaka (JP); Daiki Sone, Osaka (JP); Yasuhide Sato, Osaka (JP); Rommel Custodio, Osaka (JP); Yuki Shimotsu, Osaka (JP); Norifumi Miyahara, Osaka (JP); Toru Nakayama, Osaka (JP)

(73) Assignee: KYOCERA Document Solutions Inc., Osaka (JP)

(\*) Notice: Subject to any disclaimer, the term of this patent is extended or adjusted under 35 U.S.C. 154(b) by 0 days.

(21) Appl. No.: 16/923,020

(22) Filed: Jul. 7, 2020

(65) Prior Publication Data
US 2021/0014375 A1  Jan. 14, 2021

(30) Foreign Application Priority Data
Jul. 11, 2019 (JP) .............................. JP2019-129296

(51) Int. Cl.
*G06F 3/12* (2006.01)
*H04N 1/00* (2006.01)

(52) U.S. Cl.
CPC ....... *H04N 1/00779* (2013.01); *H04N 1/0057* (2013.01); *H04N 1/0097* (2013.01);
(Continued)

(58) Field of Classification Search
CPC .......... H04N 1/00779; H04N 1/00413; H04N 1/0057; H04N 1/00724; H04N 1/00769; H04N 1/0097
See application file for complete search history.

(56) References Cited

U.S. PATENT DOCUMENTS

| 2008/0181637 A1* | 7/2008 | Toda .................. G03G 15/5087 399/45 |
| 2008/0187344 A1* | 8/2008 | Yoshizawa ......... G03G 15/6573 399/76 |

(Continued)

FOREIGN PATENT DOCUMENTS

JP 2009-218989 A 9/2009

*Primary Examiner* — Moustapha Diaby
(74) *Attorney, Agent, or Firm* — Studebaker & Brackett PC

(57) ABSTRACT

An image forming apparatus includes an image forming section, a case section, a conveyance section, a controller, an acquiring section, and storage. The controller controls the image forming section and the conveyance section according to mechanical settings information corresponding to a type of the sheet. The acquiring section acquires an identification image for identifying the type of the sheet. The storage stores therein mechanical-settings-information candidates and registered images associated with the mechanical-settings-information candidates. The controller determines whether or not a matching image exists when a sheet is loaded in the case section. Here, the matching image is a registered image matching the identification image of the registered images. The controller adjusts mechanical settings information based on a mechanical-settings-information candidate associated with the matching image of the mechanical-settings-information candidates when determining that the matching image exists.

7 Claims, 13 Drawing Sheets

(52) U.S. Cl.
CPC ..... *H04N 1/00413* (2013.01); *H04N 1/00724* (2013.01); *H04N 1/00769* (2013.01)

(56) References Cited

U.S. PATENT DOCUMENTS

| | | | |
|---|---|---|---|
| 2013/0216244 A1* | 8/2013 | Miyazaki | G03G 15/5062 399/15 |
| 2014/0029055 A1* | 1/2014 | Shimura | G06K 15/40 358/1.16 |
| 2015/0153697 A1* | 6/2015 | Miyazaki | G03G 15/556 399/49 |

* cited by examiner

| No. | Manufacturer name | Product name | Product number | Paper type | Size | Weight | Register number of registered images | |
|-----|---|---|---|---|---|---|---|---|
| 101 | Company A | Sheet A1 | AA40 | Plain paper | A4 | 80(g/m²) | 3 (sheets) | ... |
| 102 | Company A | Sheet A2 | AA30 | Plain paper | A3 | 80(g/m²) | 7 (sheets) | ... |
| 103 | Company A | Sheet A3 | AA41 | Cardboard | A4 | 90(g/m²) | 1 (sheets) | ... |
| 201 | Company B | Sheet B1 | BA42 | Coated paper | A4 | 80(g/m²) | 10 (sheets) | ... |
| 202 | Company B | Sheet B2 | BA32 | Coated paper | A3 | 80(g/m²) | 1 (sheets) | ... |
| 203 | Company B | Sheet B3 | BA40 | Plain paper | A3 | 80(g/m²) | 3 (sheets) | ... |
| 301 | Company C | Sheet C1 | CA41 | Cardboard | A4 | 90(g/m²) | 0 (sheets) | ... |
| 302 | Company C | Sheet C2 | CSRA30 | Plain paper | SRA3 | 90(g/m²) | 0 (sheets) | ... |
| 303 | Company C | Sheet C3 | CSRA40 | Plain paper | SRA4 | 100(g/m²) | 3 (sheets) | ... |
| 401 | Company D | Sheet D1 | DSRA42 | Coated paper | SRA4 | 100(g/m²) | 3 (sheets) | ... |
| 501 | Company E | Sheet E1 | EA30 | Plain paper | A3 | 90(g/m²) | 0 (sheets) | ... |

FIG. 12

IMAGE FORMING APPARATUS AND NON-TRANSITORY COMPUTER READABLE STORAGE MEDIUM

INCORPORATION BY REFERENCE

The present application claims priority under 35 U.S.C. § 119 to Japanese Patent Application No. 2019-129296, filed on Jul. 11, 2019. The contents of this application are incorporated herein by reference in their entirety.

BACKGROUND

The present disclosure relates to an image forming apparatus and a non-transitory computer readable storage medium.

An industrial image forming apparatus includes case sections each of which contains sheets. In the industrial image forming apparatus, appropriate mechanical settings are made for each of sheet types in the case sections in order to obtain high quality image formed products.

A printer sets a paper type in printing conditions in the case where printing is performed with printing paper replaced with printing paper of a different paper type. Specifically, the printer includes a flat-head scanner, a paper-type-recognition section, and a printing-conditions setting section. The flat-head scanner reads paper type information printed on a package that wraps printing paper. Examples of the paper type information include barcode print information used for product management and the like, and number information used for product management and the like. The paper-type-recognition section recognizes a paper type of the printing paper from the paper type information of the package read by the flat-head scanner. The printing-conditions setting section sets the paper type recognized by the paper-type-recognition section to the printing conditions.

SUMMARY

An image forming apparatus according an aspect of the present disclosure includes an image forming section, a case section, a conveyance section, a controller, an acquiring section, and storage. The image forming section forms an image on a sheet. The case section contains the sheet. The conveyance section conveys the sheet contained in the case section to the image forming section. The controller controls the image forming section and the conveyance section according to mechanical settings information corresponding to a type of the sheet. The acquiring section acquires an identification image for identifying the type of the sheet. The storage stores therein mechanical-settings-information candidates and registered images respectively associated with the mechanical-settings-information candidates. The controller determines whether or not a matching image exists when a sheet is loaded in the case section. Here, the matching image is a registered image matching the identification image of the registered images. The controller adjusts the mechanical settings information based on a mechanical-settings-information candidate associated with the matching image of the mechanical-settings-information candidates when determining that the matching image exists.

A non-transitory computer readable storage medium according to an aspect of the present disclosure stores an adjustment program used for adjusting mechanical settings information in an image forming apparatus. The image forming apparatus includes an image forming section, a case section, a conveyance section, a controller, an acquiring section, and storage. The image forming section forms an image on a sheet. The case section contains the sheet. The conveyance section conveys the sheet contained in the case section to the image forming section. The controller controls the image forming section and the conveyance section according to the mechanical settings information corresponding to a type of the sheet. The acquiring section acquires an identification image for identifying the type of the sheet. The storage stores therein mechanical-settings-information candidates and registered images associated with the mechanical-settings-information candidates. The adjustment program causes a computer to carry out a first procedure and a second procedure. The first procedure is a procedure for determining whether or not a matching image exists when a sheet is loaded in the storage case section. Here, the matching image is a registered image matching the identification image of the registered images. The second procedure is a procedure for adjusting the mechanical settings information based on a mechanical-settings-information candidate associated with the matching image of the mechanical-settings-information candidates when determining that the matching image exists.

BRIEF DESCRIPTION OF THE DRAWINGS

FIG. 12 illustrates a second register screen in the embodiment of the present disclosure.

DETAILED DESCRIPTION

Figure 1:
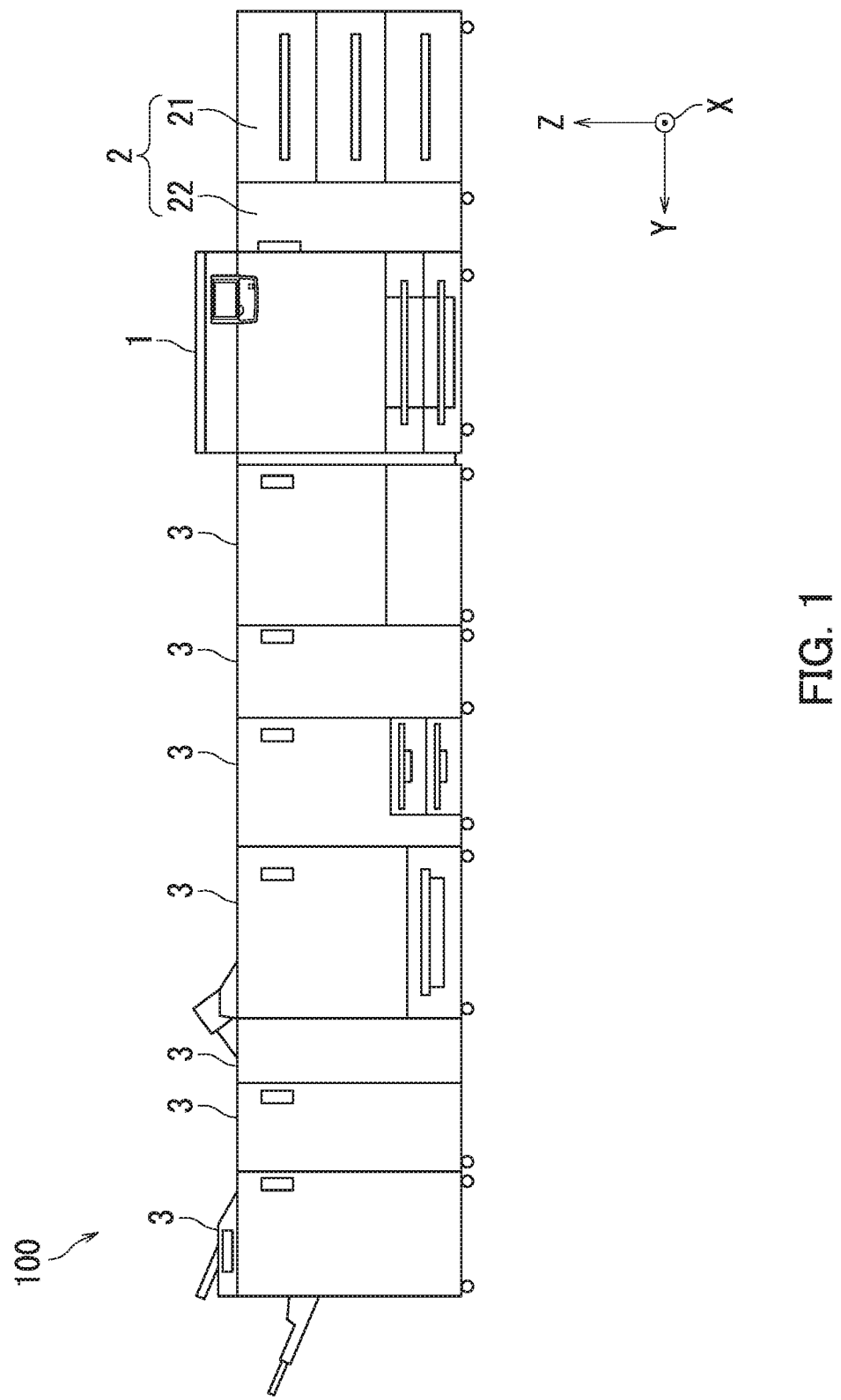
FIG. 1 is a structural diagram of an image forming apparatus according to an embodiment of the present disclosure.

An image forming apparatus according to an embodiment of the present disclosure will hereinafter be described with reference to the accompanying drawings. Elements that are the same or equivalent are labeled with the same reference signs in the drawings and description thereof is not repeated. Some of the drawings in the embodiment of the present disclosure depict mutually perpendicular X-axis, Y-axis, and Z-axis. The Z-axis is parallel to a vertical line, while the X-axis and the Y-axis are parallel to a horizontal line.

The image forming apparatus 100 according to the present embodiment will be described with reference to FIG. 1. FIG. 1 is a structural diagram of the image forming apparatus 100 according to the present embodiment.

The image forming apparatus 100 forms an image on a commercially available sheet S and performs a post-process. The image forming apparatus 100 is an industrial inkjet printer. As illustrated in FIG. 1, the image forming apparatus 100 includes an image-forming-apparatus body 1, a feeder 2, and optional devices 3. The feeder 2 is attached to the image-forming-apparatus body 1. One of the optional devices 3 is attached to the image-forming-apparatus body 1.

The image-forming-apparatus body 1 forms an image on a sheet S. A sheet P with the image formed thereon is accordingly obtained. The sheet P with the image formed thereon is hereinafter referred to as an "image-formed sheet P". A structure of the image-forming-apparatus body 1 will be described later with reference to FIG. 2.

The feeder 2 feeds the sheet S to the image-forming-apparatus body 1. As illustrated in FIG. 1, the feeder 2 includes a feeder body 21 and a relay device 22. The feeder 2 is attached to the relay device 22. The relay device 22 is attached to the image-forming-apparatus body 1. The feeder body 21 includes case sections. Each of the case sections contains sheets S. The feeder body 21 feeds the sheets S contained in one of case sections toward the image-forming-apparatus body 1 one at a time. The feeder body 21 is an optional device such as a large paper feed deck. The relay device 22 conveys the sheet S fed from the feeder body 21 to the image-forming-apparatus body 1. The relay device 22 is an optional device that connects the feeder body 21 and the image-forming-apparatus body 1. The relay device 22 is for example an attachment kit.

Examples of the optional devices 3 include a binding device and a post-processing device. The post-processing device performs a post-process of the image-formed sheet P. Examples of the post-process include punching, shifting, and stapling.

Figure 2:
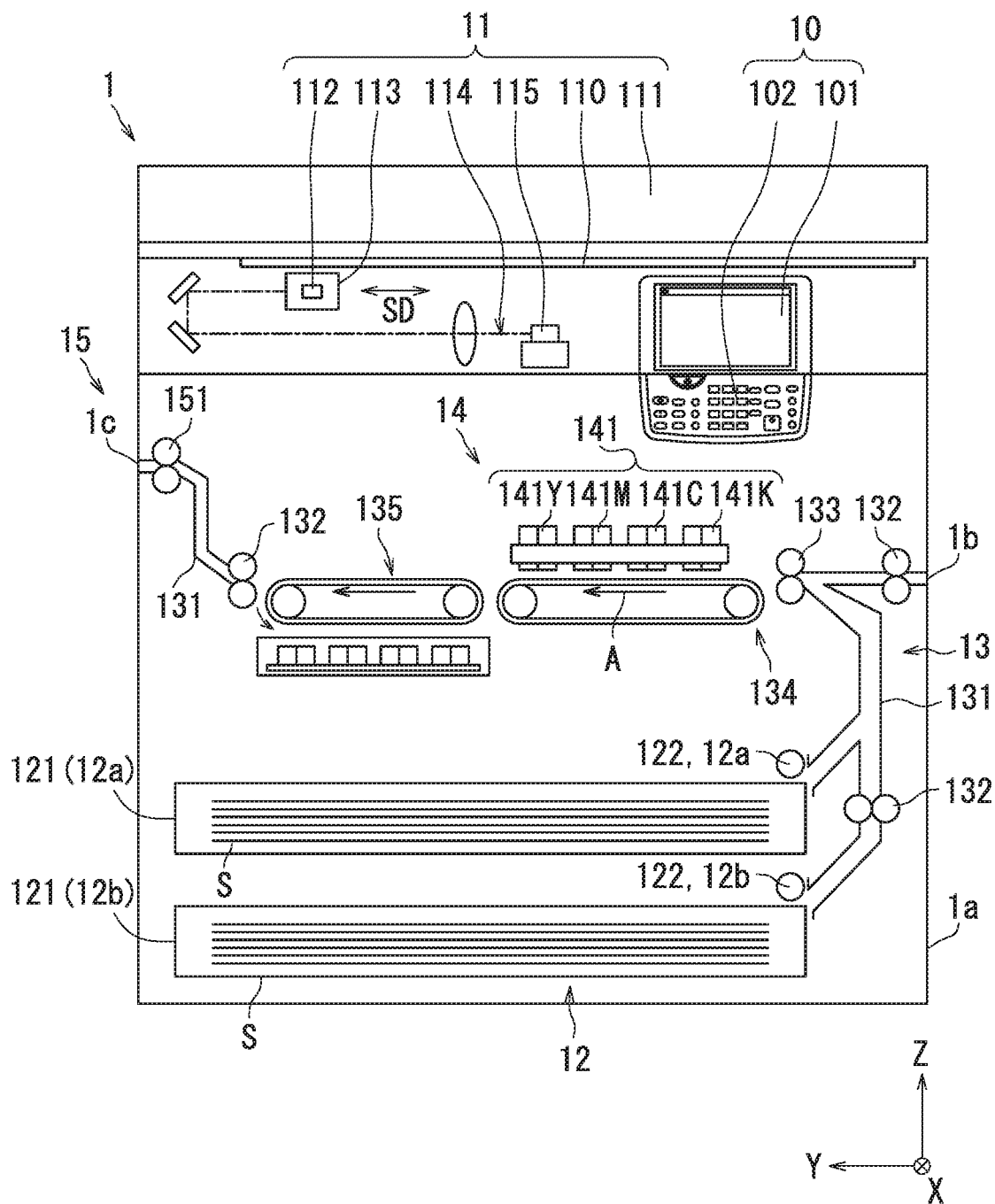
FIG. 2 is a structural diagram of an image-forming-apparatus body in the embodiment of the present disclosure.

The structure of the image-forming-apparatus body 1 will next be described with reference to FIG. 2. FIG. 2 is a structural diagram of the image-forming-apparatus body 1 in the present embodiment.

The image-forming-apparatus body 1 forms an image on a sheet S with ink. As illustrated in FIG. 2, the image-forming-apparatus body 1 includes a housing 1a, an operation panel section 10, a reader section 11, a feeder section 12, a conveyance section 13, an image forming section 14, and an ejection section 15. The reader section 11 is an example of an acquiring section.

The housing 1a accommodates therein the feeder section 12, the conveyance section 13, the image forming section 14, and the ejection section 15. An entrance port 1b and an exit port 1c are formed in the housing 1a. The entrance port 1b allows a sheet S to be entered into the housing 1a. Here, the sheet S is conveyed from the relay device 22 of the feeder 2 as described with reference to FIG. 1. The exit port 1c allows the image-formed sheet P to be exited outside the housing 1a.

The image forming section 14 forms an image on the sheet S by ejecting ink based on image formation information. In the present embodiment, the image forming section 14 includes four lineheads 141. The four lineheads 141 include a linehead 141Y that ejects a yellow ink, a linehead 141M that ejects a magenta ink, a linehead 141C that ejects a cyan ink, and a linehead 141K that ejects a black ink. The lineheads 141K, 141C, 141M, and 141Y are arranged in a conveyance direction A of the sheet S in that order. Each ink of the lineheads contains an oil-based ink or a water-based ink.

The image formation information contains image formation data and image formation settings information. The image formation data represents an image to be formed on the sheet S. The image formation settings information includes copy number information, simplex/duplex information, and monochrome/color information. The copy number information represents the number of copies. The simplex/duplex information represents simplex image formation/duplex image formation. The monochrome/color information represents monochrome printing/color printing.

The feeder section 12 conveys the sheets S toward the conveyance section 13 one at a time. The feeder section 12 includes a first feeder section 12a and a second feeder section 12b. The first feeder section 12a includes a case section 121 and a feeding roller 122. The case section 121 contains sheets S. The feeding roller 122 picks up the sheets S contained in the case section 121 to convey the sheets S toward the conveyance section 13 one at a time. The feeding roller 122 includes a pickup roller, a feed roller, and a retard roller. A structure of the second feeder section 12b is similar to that of the first feeder section 12a. The case section 121 of the first feeder section 12a and a case section 121 of the second feeder section 12b may hereinafter be referred to as a "first case section 121a" and a "second case section 121b", respectively.

The conveyance section 13 conveys the sheet S from the feeder section 12 or the entrance port 1b to the ejection section 15 through the image forming section 14. Specifically, the conveyance section 13 includes conveyance guides 131, conveyance roller pairs 132, a registration roller pair 133, a first conveyance unit 134, and a second conveyance unit 135. The conveyance guides 131 constitute a conveyance path of the sheet S. The conveyance roller pairs 132 convey the sheet S along the conveyance path. The registration roller pair 133 adjusts conveyance timing of the sheet S to the first conveyance unit 134 according to ejection timing of the inks from the image forming section 14. The first conveyance unit 134 faces respective nozzle surfaces of the four lineheads 141. The first conveyance unit 134 conveys the sheet S in an area immediately below the nozzle surfaces of the four lineheads 141. The second conveyance unit 135 conveys the sheet S, sent out from the first conveyance unit 134, toward the ejection section 15.

The ejection section 15 ejects the sheet S outside the housing 1a from the exit port 1c. The ejection section 15 includes an ejection roller pair 151. The ejection roller pair 151 sends out the sheet S toward one of the optional devices 3 described with reference to FIG. 1 through the exit port 1c.

The operation panel section 10 allows a user to enter an instruction therethrough. The operation panel section 10 includes a display section 101 and operation buttons 102. The display section 101 displays various processing results. The display section 101 includes a touch sensor and allows the user to enter an operation therethrough. The operation buttons 102 include a start button, a cancel button, arrow keys, a numeric keypad, an adjustment mode button, and a register mode button. The start button is a button that instructs the image-forming-apparatus body 1 to carry out various functions (various processes). The cancel button is a button that allows the user to enter a cancel operation therethrough. The arrow keys are buttons that allow the user to change between selection targets. The numeric keypad includes buttons that allow the user to enter a number therethrough. The adjustment mode button is an ON/OFF settings button that allows the user to change ON/OFF settings in an adjustment mode therethrough. The adjustment mode is an execution mode of an adjustment process to be described later. The register mode button is an ON/OFF settings button that allows the user to change ON/OFF settings in a register mode therethrough. The register mode is an execution mode of a register process to be described later.

The reader section 11 reads an image of an object-to-be-read to generate image data when an instruction to start reading is entered through the operation panel section 10. The object-to-be-read includes a document and a package of sheets S. The package of the sheets S includes a packaging bag of the sheets S and a packaging box of the sheets S. The reader section 11 includes contact glass 110, a platen cover 111, a light source 112 a carriage 113, an optical system 114, and a charge-coupled device (CCD) image sensor 115.

The contact glass 110 allows the object-to-be-read to be placed thereon. The platen cover 111 is free to open and close. The contact glass 110 is uncovered with the platen cover 111 when the platen cover 111 is put into an opening position. In contrast, the contact glass 110 is covered with the platen cover 111 when the platen cover 111 is put into a closing position. The light source 112 is supported by the carriage 113. The carriage 113 moves in a sub-scanning direction. The light source 112 emits light on the object-to-be-read placed on the contact glass 110 while being moved in the sub-scanning direction. The optical system 114 guides light reflected by the object-to-be-read to the CCD image sensor 115. The CCD image sensor 115 converts the light guided by the optical system 114 into an electric signal to be output. Specifically, the CCD image sensor 115 outputs a signal containing image data representing an image of the object-to-be-read.

Figure 3:
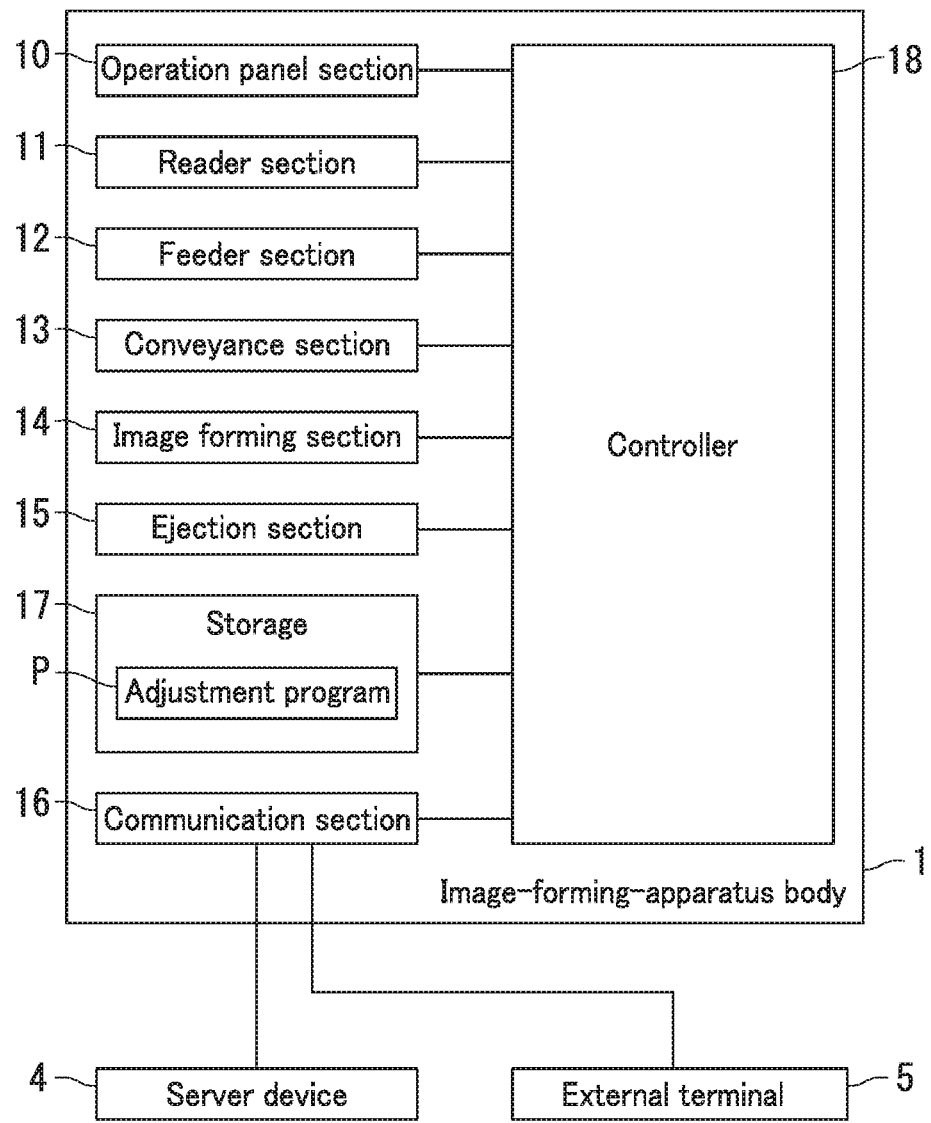
FIG. 3 is a structural block diagram of the image-forming-apparatus body in the embodiment of the present disclosure.

The structure of the image forming apparatus 100 will then further be described with reference to FIGS. 1 to 3. FIG. 3 is a structural diagram of the image-forming-apparatus body 1 in the present embodiment.

As illustrated in FIG. 3, the image-forming-apparatus body 1 further includes a communication section 16, storage 17, and a controller 18.

The storage 17 includes a hard disk drive (HDD), random-access memory (RAM), and read-only memory (ROM). The storage 17 stores therein computer programs for controlling an operation of each component of the image-forming-apparatus body 1. The computer program includes firmware and various control programs. The various control programs include an adjustment program T. Note that each control program may be stored in a storage medium. Examples of the storage medium include CD-ROM and flash memory.

The storage 17 stores therein mechanical settings information for each of the case sections 121. Here, the mechanical settings information corresponds to a type of the sheets S contained in a corresponding case section 121. In the present embodiment, the case section 121 includes case sections of the feeder body 21 in addition to the first and second case sections 121a and 121b. The first and second feeder sections 121a and 121b, and the case sections of the feeder body 21 may hereinafter be referred to as "feeder sections 121". The case sections of the feeder body 21 may hereinafter be referred to as a "third case section" to an "N-th case section". Here, the N is a natural number of 3 or more.

The mechanical settings information includes parameter adjustment values for controlling the image forming section 14 and the conveyance section 13. The parameter adjustment values are optimized in order to obtain a high quality image-formed sheet P. Specifically, the mechanical settings information includes ink ejection distance adjustment, regist deflection amount adjustment, conveyance speed adjustment, leading edge timing adjustment, and color adjustment. The parameter adjustment values included in the mechanical settings information differ for each type of image-forming-apparatus bodies 1. In the present embodiment, the mechanical settings information is defined by a manufacturer of the image-forming-apparatus body 1. The user operating the operation buttons 102 enables adjustment of the mechanical settings information.

The type of the sheets S is classified according to product information of the sheets S. When product information of sheets S completely matches product information of other sheets S, the former sheets S and the latter sheets are identical in type. When product information of sheets S does not match product information of other sheets S, the former sheets S and the latter sheets are different in type. Product information of sheets S includes a product number, a product name, and a manufacturer name. Note that a type of sheets S may be classified according to attribute information of the sheets S. The attribute information of the sheets S is information on size, paper type, weight, thickness, color, and gloss of sheets S. Examples of the paper type include thin paper, plain paper, cardboard, coated paper and an OHP sheet. Examples of the size include A5, B4, A4, A3, SRA3, and SRA4.

The storage 17 stores therein a candidate database. Each record (data) in the candidate database is associated with sheet information, mechanical-settings-information candidates, and registered images. The sheet information contains product information of sheets S, attribute information of the sheets S, and loading orientation information of sheets S. The loading orientation information of sheets S indicates that the sheets S are loaded in a case section 121 in portrait or landscape orientation.

In the present embodiment, each of the registered images is an image read by the reader section 11. Each of the registered images needs to be an image from which a type of corresponding sheets S can be identified. For example, each of the registered images contains an image of the package of the corresponding sheets S. For example, each of the registered images may contain a design, a pattern, numbers, symbols, and characters of the package of the corresponding sheets S. For example, each of the registered images may contain a pattern mark provided by the user on the corresponding sheets S or the package of the corresponding sheets S. The pattern mark is a predetermined mark indicating the type of the corresponding sheets S.

The registered images may include registered images associated with one of the mechanical-settings-information candidates. In other words, the registered images may be associated with at least one of the mechanical-settings-information candidates in the candidate database.

The controller 18 is a hardware circuit including a processor such as a central processing unit (CPU). The controller 18 carries out the control programs stored in the storage 17, thereby controlling the operation panel section 10, the reader section 11, the feeder section 12, the conveyance section 13, the image forming section 14, the ejection section 15, the communication section 16, and the storage 17.

The controller 18 controls the image forming section 14 and the conveyance section 13 according to the mechanical settings information stored in the storage 17. The controller 18 carries out an adjustment process and a register process. The controller 18 carries out the adjustment process according to the adjustment program T. The adjustment process and the register process will be described with reference to FIGS. 4 to 6B.

The communication section 16 communicates with a server device 4 and an external terminal 5 through a network. That is, the communication section 16 transmits and receives data to and from the server device 4 and the external terminal 5 through the network. The communication section 16 is a communication interface.

The server device 4 manages reference information. The reference information is associated with mechanical settings information for each of types of image-forming-apparatus bodies 1 and attribute information of sheets S. The server device 4 periodically transmits the reference information to the image-forming-apparatus body 1 through the network. The controller 18 receives the reference information, and then updates, of the candidate database, the product information of the sheets S, the attribute information of the sheets S, and the mechanical settings information according to the received reference information. The server device 4 is managed by for example the manufacturer of the image-forming-apparatus body 1.

Examples of the external terminal 5 include a desktop personal computer, a notebook personal computer, a tablet terminal, and a smartphone. The external terminal 5 enables the user to for example create an image formation instruction to the image-forming-apparatus body 1 to perform image formation. The image formation instruction includes image formation information and feeding designation information. The feeding designation information is information for designating a case section 121 to feed sheets S of the case sections 121. The controller 18 receives the image formation instruction, and then causes the image forming section 14 to form an image on a sheet S with the inks based on the image formation instruction.

The adjustment process will next be described with reference to FIGS. 4 and 5. The adjustment process is a process for, after sheets S are newly loaded in a case section 121, adjusting mechanical settings information corresponding to the case section 121 containing the newly loaded sheets S. The mechanical settings information corresponding to the case section 121 containing the newly loaded sheets S may hereinafter be referred to as "mechanical settings information before adjustment".

Figure 4:
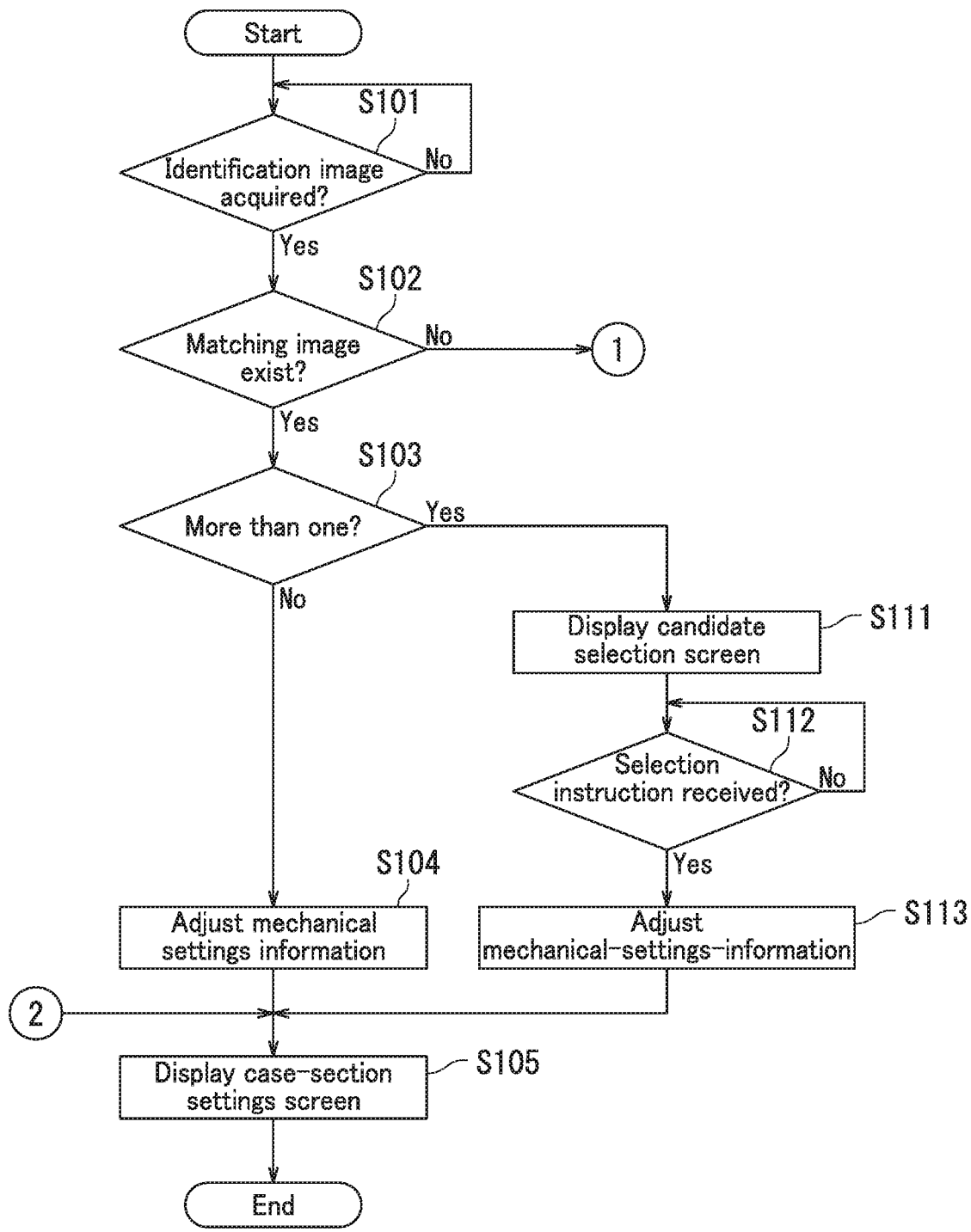
FIG. 4 is part of a flowchart depicting an adjustment process by the image-forming-apparatus body in the embodiment of the present disclosure.
Figure 5:
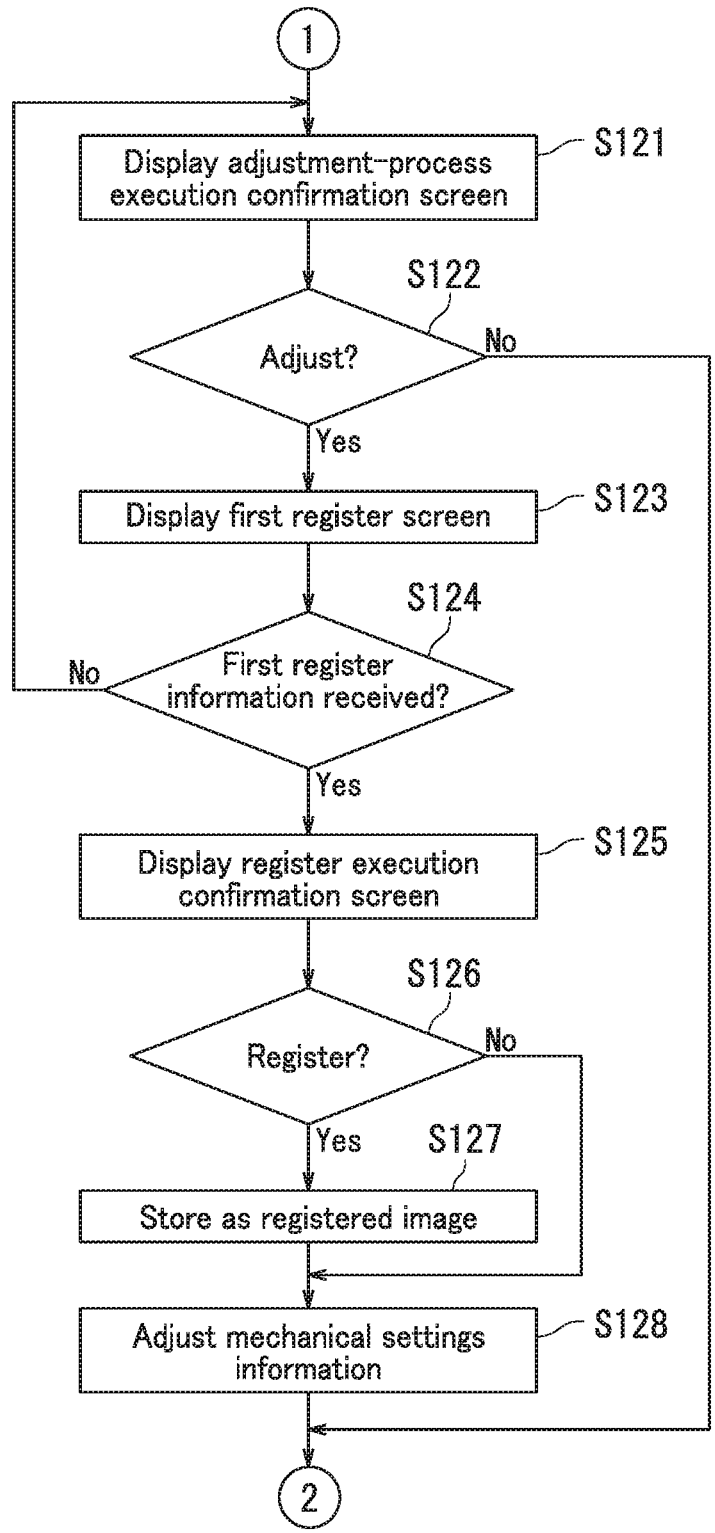
FIG. 5 is remaining part of the flowchart depicting the adjustment process by the image-forming-apparatus body in the embodiment of the present disclosure.
Figure 6:
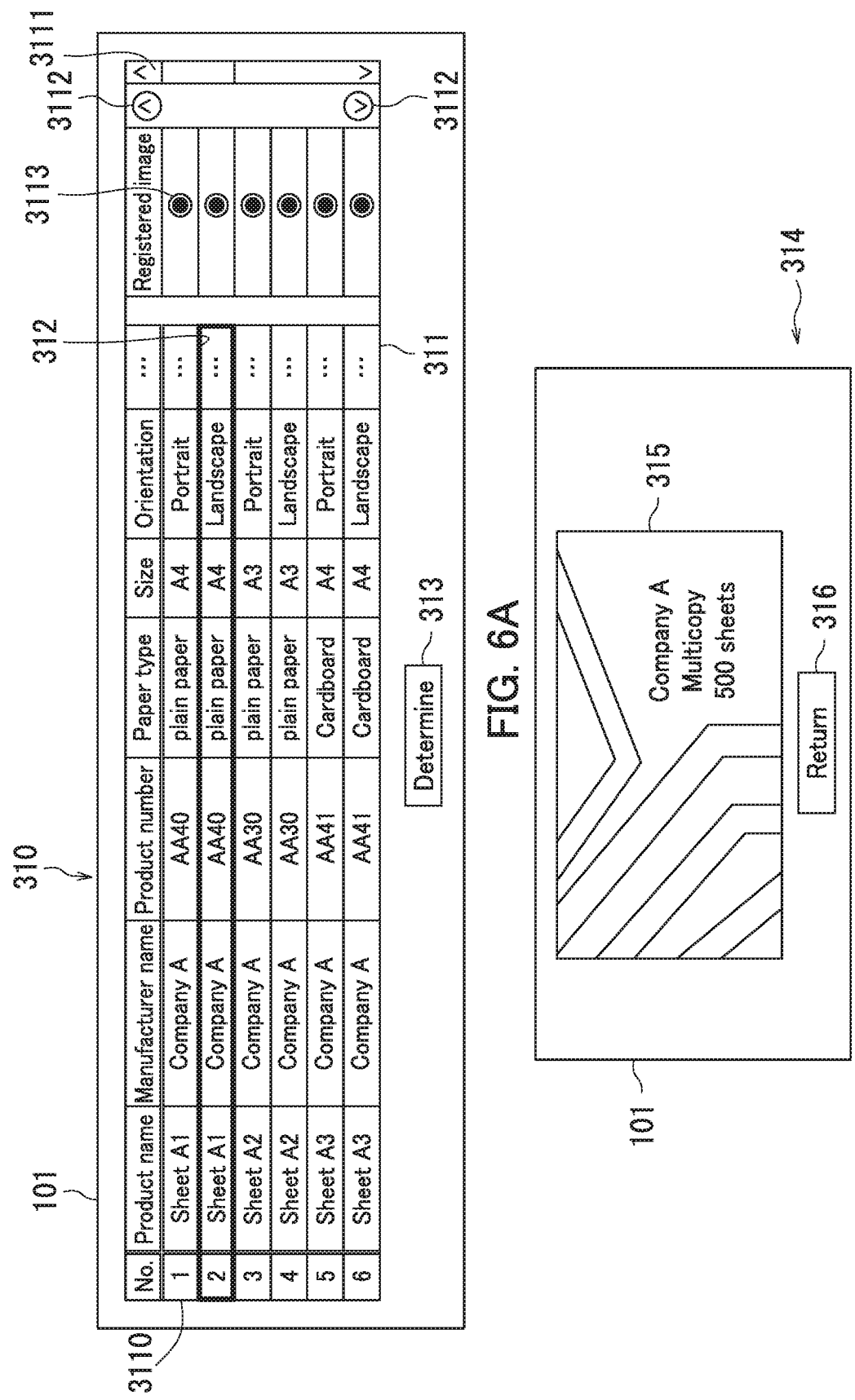
FIG. 6A illustrates a candidate selection screen in the embodiment of the present disclosure.
FIG. 6B illustrates a registered image display screen in the embodiment of the present disclosure.

FIGS. 4 and 5 depict a flowchart of the adjustment process of the image-forming-apparatus body 1 in the present embodiment. The adjustment process is started as a result of the user entering information identifying the case section 121 containing the newly loaded sheets S with an adjustment mode activated (ON). The user pushes down the adjustment mode button, so that the adjustment mode is activated (turned on). The information identifying the case section 121 containing the newly loaded sheets S is entered into the controller 18 as a result of the user operating the arrow keys and then selecting for example one from a list of case sections 121 displayed on the display section 101.

At Step S101: the controller 18 determines whether or not the reader section 11 acquires an identification image. The identification image is an image for identifying a type of the newly loaded sheets S in the case section 121. The identification image contains an image of a package of the newly loaded sheets S in the case section 121. According to an object-to-be-read representing a registered image, the user selects the object-to-be-read for generating the identification image. For example, in the case where a registered image contains a pattern mark provided by the user on the package of the sheets S, the identification image contains the pattern mark provided by the user on the package of the sheets S.

When the controller 18 determines that the reader section 11 has acquired the identification image (Yes at Step S101), the process proceeds to step S102. When the controller 18 determines that the reader section 11 has not acquired the identification image (No at Step S101), the process returns to step S101.

At Step S102: the controller 18 refers to the candidate database stored in the storage 17 and then determines whether or not a matching image exists in the registered images. The matching image is a registered image that matches the identification image.

In the present embodiment, the controller 18 calculates a degree of similarity for each of the registered images. When a registered image whose calculated degree of similarity satisfies a predetermined condition, the controller 18 determines that the matching image exists. The degree of similarity indicates how similar the identification image and the registered image are. The controller 18 calculates a color histogram of each of the identification image and the registered images. The controller 18 calculates a degree of color similarity. The degree of color similarity indicates how similar the color histogram of the identification image and the color histogram of each registered image are. The controller 18 determines whether or not, of the registered images, one or more registered images whose each degree of color similarity is equal to or higher than a predetermined threshold exist. When the controller 18 determines that, of the registered images, one or more registered images whose each degree of color similarity is equal to or higher than the predetermined threshold exist, the controller 18 determines that one or more matching images exist. When the controller 18 determines that, of the registered images, one or more registered images whose each degree of color similarity is equal to or higher than the predetermined threshold do not exist, the controller 18 determines that no matching image exists. The storage 17 stores therein the predetermined threshold.

When the controller 18 determines that, of the registered images, one or more matching images exist (Yes at Step S102), the process proceeds to Step S103. When, of the registered images, no matching image exists (No at Step S102), the process proceeds to Step S121 depicted in FIG. 5.

At Step S103: the controller 18 determines whether or not the number of the one or more matching images is more than one. When the controller 18 determines that the number of the one or more matching images is not more than one (No at Step S103), the process proceeds to Step S104. When the controller 18 determines that the number of the one or more matching images is more than one (Yes at Step S103), the process proceeds to Step S111.

At Step S104: the controller 18 adjusts the mechanical settings information based on a mechanical-settings-information candidate, associated with the matching image, of the mechanical-settings-information candidates. Specifically, the controller 18 determines whether or not the mechanical settings information before adjustment matches the mechanical-settings-information candidate associated with the matching image. When the controller 18 determines that the mechanical settings information before adjustment does not match the mechanical settings information associated with the matching image, the controller 18 changes the mechanical settings information before adjustment to the mechanical settings information associated with the matching image. That is, the controller 18 stores, in the storage 17, the mechanical settings information associated with the matching image as mechanical settings information corresponding to the case section 121 containing the newly loaded sheets S. When the controller 18 determines that the mechanical settings information that is set to the case section 121 matches the mechanical settings information before adjustment, the controller 18 does not change the mechanical settings information before adjustment. The process then proceeds to Step S105.

At Step S111: the controller 18 causes the display section 101 to display a candidate selection screen 310. The candidate selection screen 310 allows the user to select one of first selection candidates 3110 corresponding to the matching images. Each of the first selection candidates 3110 is associated with a mechanical-settings-information candidate. The process then proceeds to Step S112. The candidate selection screen 310 is one example of a list of the first selection candidates 3110.

Here, the candidate selection screen 310 is described with reference to FIGS. 6A and 6B. FIG. 6A depicts an example of the candidate selection screen 310 in the present embodiment. FIG. 6B depicts an example of a registered image display screen 314. As illustrated in FIG. 6A, the candidate selection screen 310 includes a first-selection-candidate display column 311, a selection frame 312, and a determination button 313. The first selection candidates 3110 are displayed in the first-selection-candidate display column 311. Specifically, the first-selection-candidate display column 311 displays the first selection candidates 3110, a scroll bar 3111, and page up and down buttons 3112. Each of the first selection candidates 3110 includes sheet information and a registered image display button 3113. When a registered image display button 3113 is pushed down, a corresponding registered image display screen 314 illustrated in FIG. 6B is displayed on the display section 101. The scroll bar 3111 allows the user to scroll a display area of the candidate selection screen 310. The candidate selection screen 310 includes two or more pages. The page up and down buttons 3112 allow the user to move a page displaying first selection candidates 3110 up and down. The selection frame 312 indicates one first selection candidate 3110 selected by the user. The determination button 313 is a button for selection of the first selection candidate 3110 indicated by the selection frame 312 of the first selection candidates 3110. This enables the user to select one of the first selection candidates 3110. The registered image display screen 314 depicted in FIG. 6B includes a registered image 315 and a return button 316. The registered image 315 is associated with sheet information of the first selection candidate 3110 corresponding to the registered image display button 3113 pushed down by the user. The registered image 315 in FIG. 6B depicts part of a packaging bag of commercially available sheets S. When the return button 316 is pushed down, the candidate selection screen 310 is displayed on the display section 101. Note that in the FIG. 6A, "portrait" in an item of loading orientation indicates that sheets S have been loaded in the case section 121 in portrait orientation. In the FIG. 6A, "landscape" in the item of loading orientation indicates that sheets S have been loaded in the case section 121 in landscape orientation.

At Step S112: the controller 18 determines whether or not the display section 101 receives a first selection instruction through the candidate selection screen 310. In other words, the controller 18 determines whether or not the determination button 313 has been pushed down. The first selection instruction is an instruction to the user to select one from the first selection candidates 3110 in the candidate selection screen 310. When the controller 18 determines that the display section 101 has received the first selection instruction (Yes at Step S112), the process proceeds to Step S113. When the controller 18 determines that the display section 101 has not received the first selection instruction (No at Step S112), the process returns to Step S112.

At Step S113: the controller 18 adjusts the mechanical settings information based on a mechanical-settings-information candidate associated with the first selection candidate 3110 selected according to the first selection instruction of the first selection candidates 3110. The mechanical-settings-information candidate associated with the first selection candidate 3110 selected according to the first selection instruction is hereinafter referred to as a "mechanical-settings-information candidate according to the first selection instruction". Specifically, the controller 18 determines whether or not the mechanical settings information before adjustment matches the mechanical-settings-information candidate according to the first selection instruction. When the controller 18 determines that the mechanical settings information before adjustment does not match the mechanical-settings-information candidate according to the first selection instruction, the controller 18 changes the mechanical settings information before adjustment to the mechanical-settings-information candidate according to the first selection instruction. That is, the controller 18 stores, in the storage 17, the mechanical-settings-information candidate according to the first selection instruction as the mechanical settings information corresponding to the case section 121 containing the newly loaded sheets S. When the controller 18 determines that the mechanical settings information corresponding to the case section 121 containing the newly loaded sheets S matches the mechanical-settings-information candidate according to the first selection instruction, the controller 18 does not change the mechanical settings information before adjustment. The process then proceeds to Step S105.

At Step S105: the controller 18 causes the display section 101 to display a case-section settings screen 320. The case-section settings screen 320 displays sheet information that is set to each of the case sections 121. The process then ends.

Figure 7:
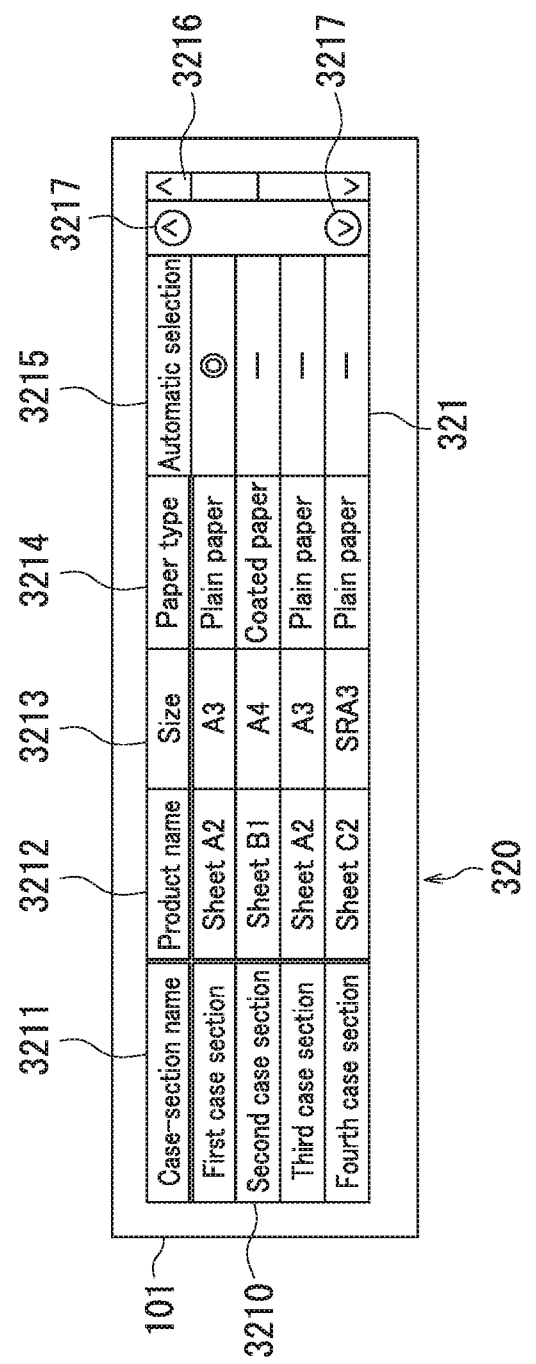
FIG. 7 illustrates a case-section settings screen in the embodiment of the present disclosure.

Here, the case-section settings screen 320 is described with reference to FIG. 7. FIG. 7 illustrates the case-section settings screen 320 in the present embodiment. The case-section settings screen 320 includes a case-section settings display column 321. Pieces of case-section information 3210 are displayed in the case-section settings display column 321. Specifically, the case-section settings display column 321 displays a case-section name item 3211, a product name item 3212, a size item 3213, a paper type item 3214, an automatic selection item 3215, a scroll bar 3216, and page up and down buttons 3217. The case-section name item 3211 indicates a name of each of the case sections 121. The product name item 3212 indicates a product name of the sheets S contained in each of the case sections 121. The size item 3213 indicates a size of the sheets S contained in each of the case sections 121. The paper type item 3214 indicates a paper type of the sheets S contained in each of the case sections 121. The automatic selection item 3215 indicates whether or not each case section 121 is designated as a case section 121 to feed sheets S in the case where no case section 121 to feed sheets S has been designated in the image formation instruction. In the case-section settings screen 320, a double circle symbol is added to an automatic selection field in the first case section being designated to the case section 121 to feed sheets S in the case where no case section 121 to feed sheets S has been designated in the image formation instruction. The scroll bar 3216 allows the user to scroll a display area of the case-section settings screen 320. The case-section settings screen 320 includes two or more pages. The page up and down buttons 3117 allow the user to move a page displaying pieces of case-section information 3210 up and down.

At Step S121: as illustrated in FIG. 5, the controller 18 causes the display section 101 to display an adjustment-process execution confirmation screen 330. The adjustment-process execution confirmation screen 330 allows the user to enter therethrough an instruction to adjust the mechanical settings information corresponding to the case section 121 containing the newly loaded sheets S. The process then proceeds to Step S122.

Figure 8:
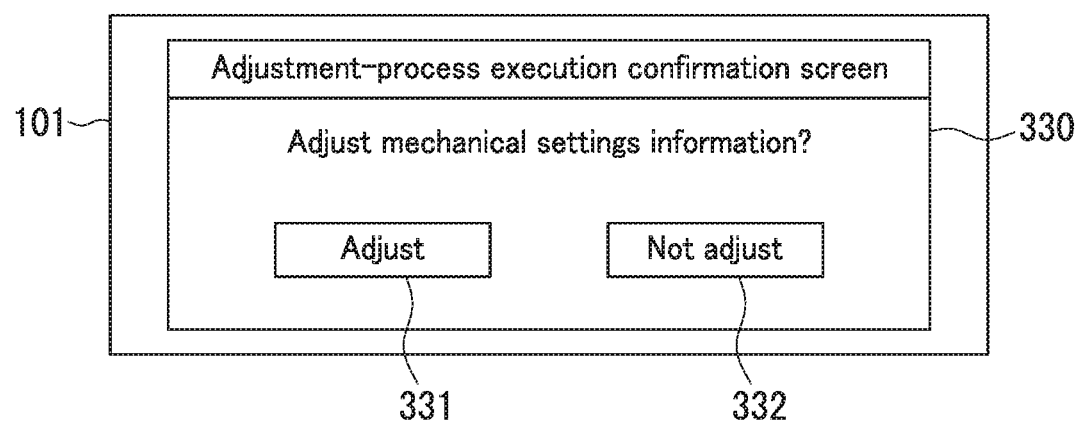
FIG. 8 illustrates an adjustment-process execution confirmation screen in the embodiment of the present disclosure.

Here, the adjustment-process execution confirmation screen 330 is described with reference to FIG. 8. FIG. 8 illustrates the adjustment-process execution confirmation screen 330 in the present embodiment. As illustrated in FIG. 8, the adjustment-process execution confirmation screen 330 includes an adjustment button 331 and a non-adjustment button 332. The adjustment button 331 activates execution of the adjustment process. The non-adjustment button 332 inactivates the execution of the adjustment process. This enables the user to select whether or not to cause the controller 18 to carry out the adjustment process.

At Step S122: the controller 18 determines whether or not the display section 101 has received an adjustment instruction through the adjustment-process execution confirmation screen 330. The adjustment instruction is an instruction to adjust the mechanical settings information corresponding to the case section 121 containing the newly loaded sheets S. Specifically, the controller 18 determines whether the adjustment button 331 has been pushed or the non-adjustment button 332 has been pushed down. When the controller 18 determines that the display section 101 has received the adjustment instruction (Yes at Step S122), in other words when the controller 18 determines that the adjustment button 331 has been pushed down, the process proceeds to Step S123. When the controller 18 determines that the display section 101 has not received the adjustment instruction (No at Step S122), in other words when the controller 18 determines that the non-adjustment button 332 has been pushed down, the process proceeds to Step S105 depicted in FIG. 4.

At Step S123: the controller 18 causes the display section 101 to display a first register screen 340. The first register screen 340 allows the user to associate therethrough the identification image with one of the mechanical-settings-information candidates. The process then proceeds to Step S124.

Figure 9:
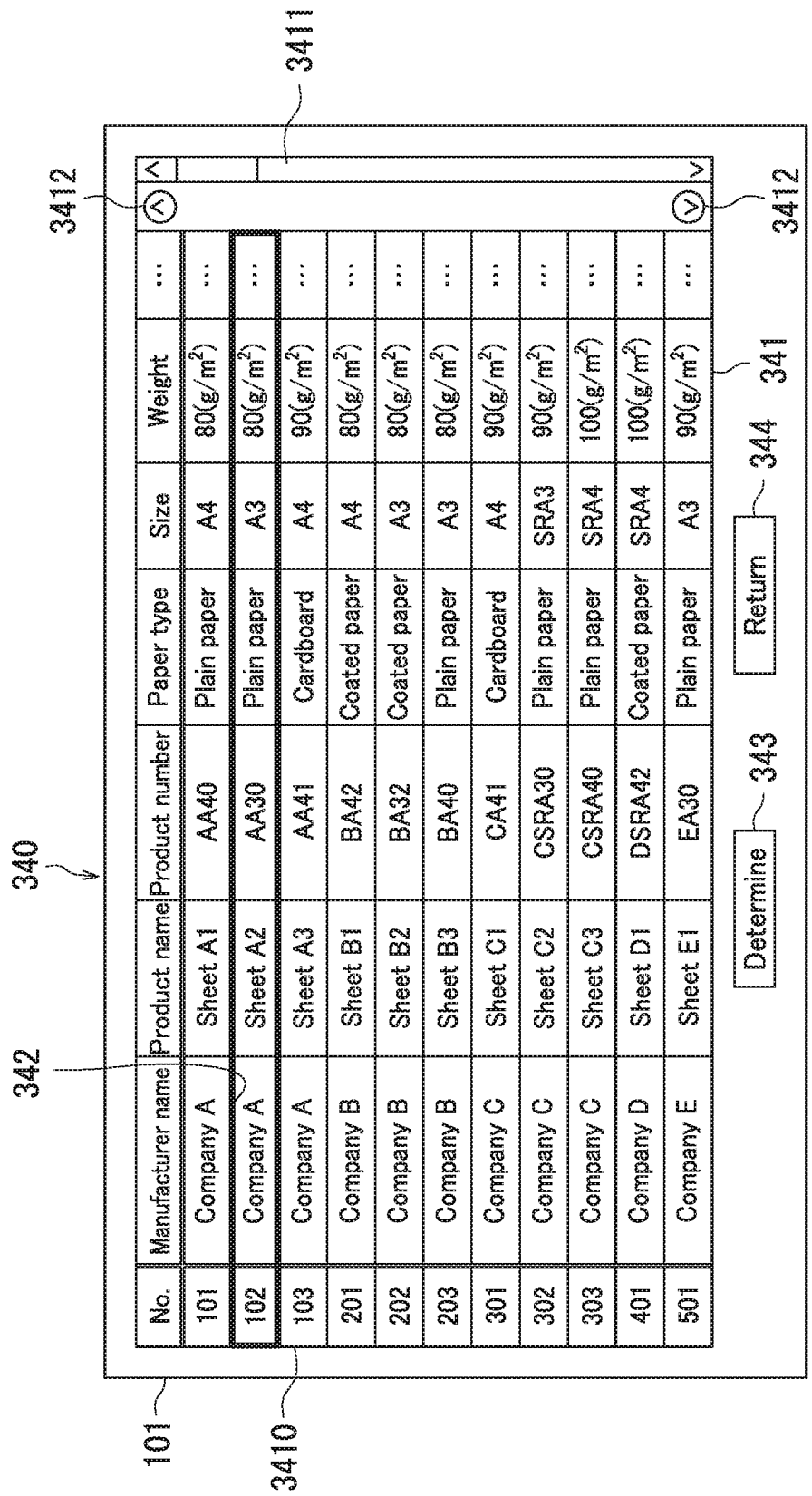
FIG. 9 illustrates a first register screen in the embodiment of the present disclosure.

Here, the first register screen 340 is described with reference to FIG. 9. FIG. 9 illustrates a first register screen 340 in the present embodiment. As illustrated in FIG. 9, the first register screen 340 includes a second-selection-candidate display column 341, a selection frame 342, a determination button 343, and a return button 344. The second-selection-candidate display column 341 displays second selection candidates 3410. Specifically, the second-selection-candidate display column 341 displays the second selection candidates 3410, a scroll bar 3411, and page up and down buttons 3412. Each of the second selection candidates 3410 includes sheet information. The scroll bar 3411 allows the user to scroll a display area of the first register screen 340. The first register screen 340 includes two or more pages. The page up and down buttons 3412 allow the user to move a page displaying second selection candidates 3410 up and down. The selection frame 342 indicates one second selection candidate 3410 selected by the user. The determination button 343 allows the user to define, as the mechanical settings information, a mechanical-settings-information candidate associated with the second selection candidate 3410 indicated by the selection frame 342 of the mechanical-settings-information candidates. The return button 344 is a button that returns the first register screen 340 displayed on the display section 101 to the adjustment-process execution confirmation screen 330. This approach enables the user to push down the determination button 343, thereby selecting one mechanical-settings-information candidate associated with the identification image from the mechanical-settings-information candidates. The approach further enables the user to push down the return button 344, thereby interrupting the identification image being associated with one of the mechanical-settings-information candidates.

At Step S124: the controller 18 determines whether the display section 101 has received first register information through the first register screen 340. In other words, the controller 18 determines whether the determination button 343 has been pushed or the return button 344 has been pushed down. The first register information is information for associating the identification image with one of the mechanical-settings-information candidates. When the controller 18 determines that the display section 101 has received the first register information (Yes at Step S124), in other words when the controller 18 determines that the determination button 343 has been pushed down, the process proceeds to Step S125. When the controller 18 determines that the display section 101 has not received the first register information (No at Step S124), in other words when the controller 18 determines that the return button 344 has been pushed down, the process returns to Step S121.

At Step S125: the controller 18 causes the display section 101 to display a register execution confirmation screen 350. The register execution confirmation screen 350 allows the user to enter therethrough an instruction to register the identification image as the registered image in the mechanical settings information indicated by the first register information. The process then proceeds to Step S126.

Figure 10:
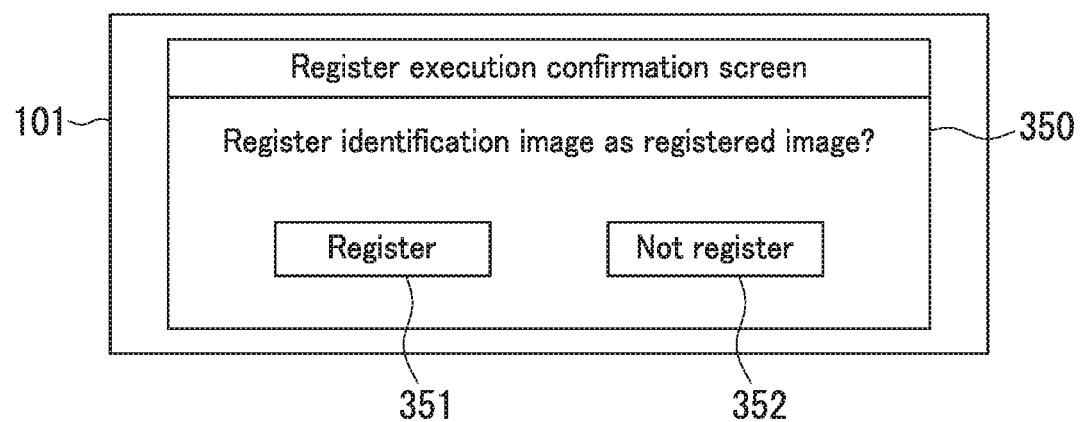
FIG. 10 illustrates a register execution confirmation screen in the embodiment of the present disclosure.

Here, the register execution confirmation screen 350 is described with reference to FIG. 10. FIG. 10 illustrates the register execution confirmation screen 350 in the present embodiment. As illustrated in FIG. 10, the register execution confirmation screen 350 includes a register button 351 and a non-register button 352. The register button 351 allows the user to register the identification image as the registered image. The non-register button 352 allows the user to cancel the identification image being registered as the registered image. This enables the user to select whether or not to register the identification image as the registered image in the mechanical settings information indicated by the first register information.

At Step S126: the controller 18 determines whether or not a register instruction has been entered through the register execution confirmation screen 350. In other words, the controller 18 determines whether the register button 351 has been pushed down or the non-register button 352 has been pushed down. The register instruction is an instruction to register the identification image as the registered image. When the controller 18 determines that the register instruction has been entered (Yes at Step S126), in other words when the controller 18 determines that the register button 351 has been pushed down, the process proceeds to Step S127. When the controller 18 determines that the register instruction has not been entered (No at Step S126), in other words when the controller 18 determines that the non-register button 352 has been pushed down, the process proceeds to Step S128.

At Step S127: the controller 18 stores, in the storage 17, the identification image as the registered image with the registered image associated with one of the mechanical-settings-information candidates based on the first register information. The process then proceeds to Step S128.

At Step S128: the controller 18 adjusts the mechanical settings information based on the mechanical-settings-information candidate, associated with the registered image, of the mechanical-settings-information candidates. Specifically, the controller 18 determines whether or not the mechanical settings information before adjustment matches the mechanical-settings-information candidate indicated by the first register instruction. When the controller 18 determines that the mechanical settings information before adjustment does not match the mechanical-settings-information candidate indicated by the first register instruction, the controller 18 changes the mechanical settings information before adjustment to the mechanical-settings-information candidate indicated by the first register instruction. That is, the controller 18 stores, in the storage 17, the mechanical-settings-information candidate indicated by the first selection instruction as the mechanical settings information corresponding to the case section 121 containing the newly loaded sheets S. When the controller 18 determines that the mechanical settings information before adjustment matches the mechanical-settings-information candidate indicated by the first register instruction, the controller 18 does not change the mechanical settings information before adjustment. The process then proceeds to Step S105 depicted in FIG. 4.

Figure 11:
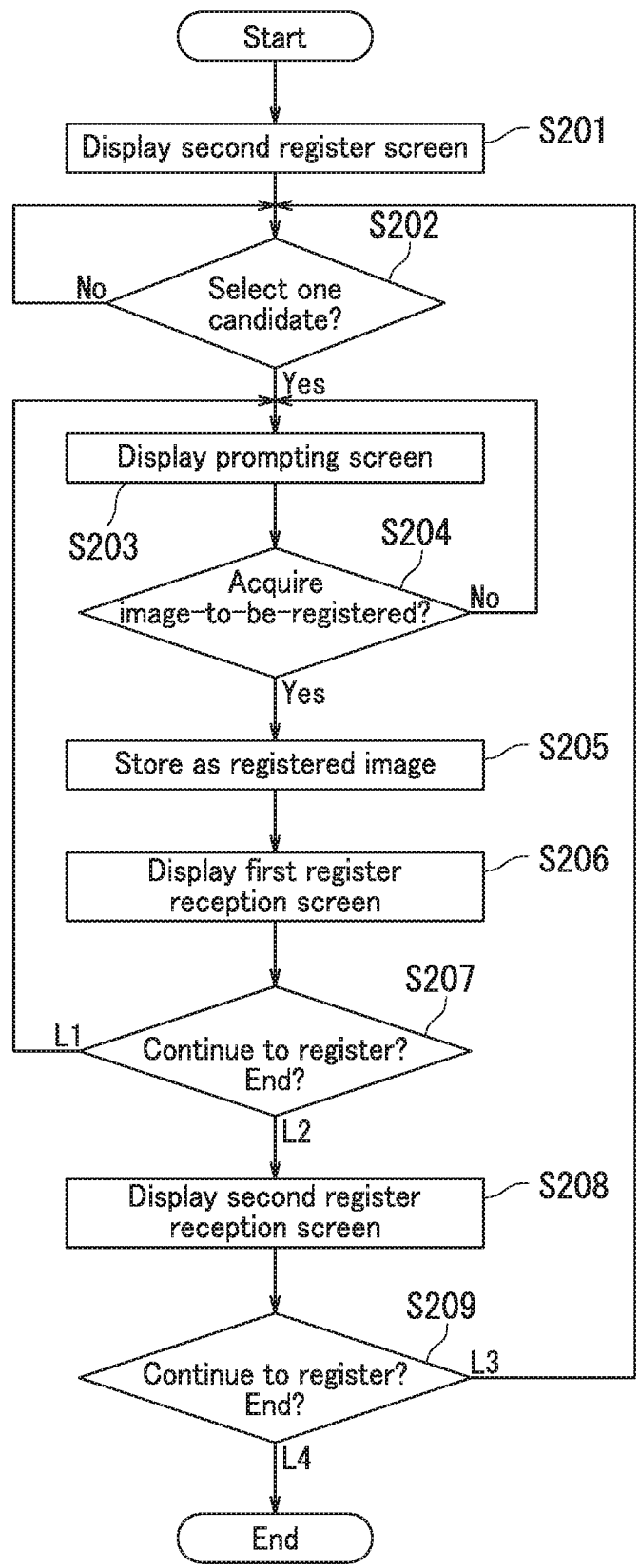
FIG. 11 is a flowchart depicting a register process by the image-forming-apparatus body in the embodiment of the present disclosure.

The register process will next be described with reference to FIG. 11. The register process is a process of registering an image-to-be-registered acquired by the reader section 11 as the registered image. FIG. 11 is a flowchart depicting the register process by the image-forming-apparatus body 1 in the present embodiment. The register process is started when the user pushes down the register mode button to activate (turn on) the register mode.

The image-to-be-registered needs to be an image that enables a type of corresponding sheets S to be identified therefrom. For example, the object-to-be-read for generating the image-to-be-registered includes the package of sheets S. For example, the image-to-be-registered may contain a design, a pattern, numbers, symbols, and characters of the package of sheets S. The image-to-be-registered may contain for example a pattern mark provided by the user on the package of sheets S.

At Step S201: the controller 18 causes the display section 201 to display a second register screen 400. The second register screen 400 allows the user to associate therethrough the image-to-be-registered with one of the mechanical-settings-information candidates. The process then proceeds to Step S202.

Here, the second register screen 400 is described with reference to FIG. 12. FIG. 12 illustrates the second register screen 400 in the present embodiment. As illustrated in FIG. 12, the second register screen 400 includes a third-selection-candidate display column 401, a selection frame 402, and a determination button 403. The third-selection-candidate display column 401 displays third selection candidates 4000. Specifically, the third-selection-candidate display column 401 displays the third selection candidates 4000, a scroll bar 4001, and page up and down buttons 4002. Each of the third selection candidates 4000 includes sheet information and register number information. The register number information indicates the number of registered images associated with the sheet information of each of the third selection candidates 4000. The scroll bar 3411 allows the user to scroll a display area of the second register screen 400. The second register screen 400 includes two or more pages. The page up and down buttons 4002 allow the user to move a page displaying third selection candidates 4000 up and down. The selection frame 402 displays one third selection candidate 4000 selected by the user. The determination button 403 allows the user to define, as the mechanical settings information, the mechanical-settings-information candidate associated with the third selection candidate 4000 selected in the selection frame 402 of the mechanical-settings-information candidates. This enables the user to push down the determination button 403, thereby selecting one mechanical-settings-information candidate associated with the third selection candidate 4000 selected by the selection frame 402.

At Step S202: the controller 18 determines whether or not a second selection instruction has been entered through the operation buttons 102. In other words, the controller 18 determines whether or not the determination button 403 has been pushed down. The second selection instruction is an instruction to select one of the mechanical-settings-information candidates. When the controller 18 determines that the second selection instruction has been entered through the operation buttons 102 (Yes at Step S202), in other words when the controller 18 determines that the determination button 403 has been pushed down, the process proceeds to Step S203. When the controller 18 determines that the second selection instruction has not been entered through the operation buttons 102 (No at Step S202), in other words when the controller 18 determines that the determination button 403 has not been pushed down, the process returns to Step S202.

At Step S203: the controller 18 causes the display section 101 to display an image-to-be-registered acquisition prompting screen 410. The image-to-be-registered acquisition prompting screen 410 displays an image prompting the user to read an image-to-be-registered with the reader section 11. The process then proceeds to Step S204.

Figure 13:
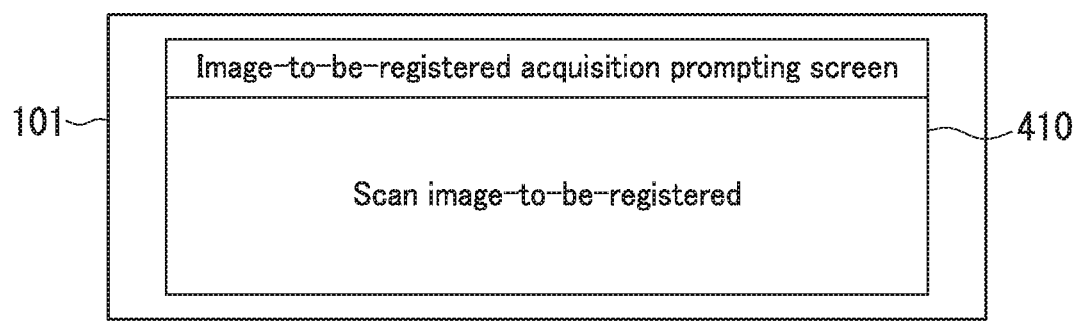
FIG. 13 illustrates an image-to-be-registered acquisition prompting screen in the embodiment of the present disclosure.

Here, the image-to-be-registered acquisition prompting screen 410 is described with reference to FIG. 13. FIG. 13 illustrates the image-to-be-registered acquisition prompting screen 410 in the present embodiment. As illustrated in FIG. 13, the image-to-be-registered acquisition prompting screen 410 displays a message of "Please read an image to be registered."

At Step S204: the controller 18 determines whether or not the reader section 11 has acquired the image-to-be-registered. When the controller 18 determines that the reader section 11 has acquired the image-to-be-registered (Yes at Step S204), the process proceeds to step S205. When the controller 18 determines that the reader section 11 has acquired no image-to-be-registered (No at Step S204), the process returns to step S204.

At Step S205: the controller 18 stores, in the storage 17, the image-to-be-registered as the registered image with the registered image associated with the mechanical-settingsinformation candidate selected according to the second selection instruction. The process then proceeds to Step S206.

At Step S206: the controller 18 causes the display section 101 to display a first register reception screen 420. The first register reception screen 420 allows the user to choose whether or not to further associate another registered image as a registered image with the mechanical-settings-information candidate selected according to the second selection instruction. The process then proceeds to Step S207.

Figure 14:
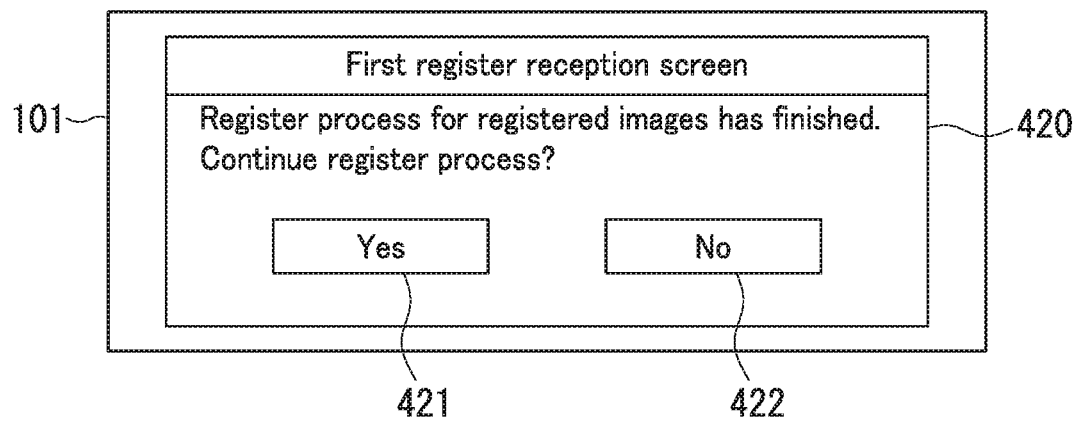
FIG. 14 illustrates a first register reception screen in the embodiment of the present disclosure.

Here, the first register reception screen 420 is described with reference to FIG. 14. FIG. 14 illustrates the first register reception screen 420 in the present embodiment. As illustrated in FIG. 14, the first register reception screen 420 includes a YES button 421 and a NO button 422. The YES button 421 is a button that allows the user to choose to further associate another registered image as a registered image with the mechanical-settings-information candidate selected according to the second selection instruction. The NO button 422 is a button that allows the user to choose not to further associate another registered image as a registered image with the mechanical-settings-information candidate selected according to the second selection instruction. This enables the user to choose whether or not to further associate another registered image as a registered image with the mechanical-settings-information candidate selected according to the second selection instruction.

At Step S207: the controller 18 determines which of the YES button 421 and the NO button 422 has been selected through the first register reception screen 420. When the controller 18 determines that the YES button 421 has been selected (L1 at Step S207), the process returns to Step S203. When the controller 18 determines that the NO button 422 has been selected (L2 at Step S207), the process proceeds to Step S208.

At Step S208: the controller 18 causes the display section 101 to display a second register reception screen 430. The second register reception screen 430 allows the user to choose whether or not to further associate the image-to-be-registered as a registered image with another mechanical-settings-information candidate different from the mechanical-settings-information candidate selected according to the second selection instruction. The process then proceeds to Step S209.

Figure 15:
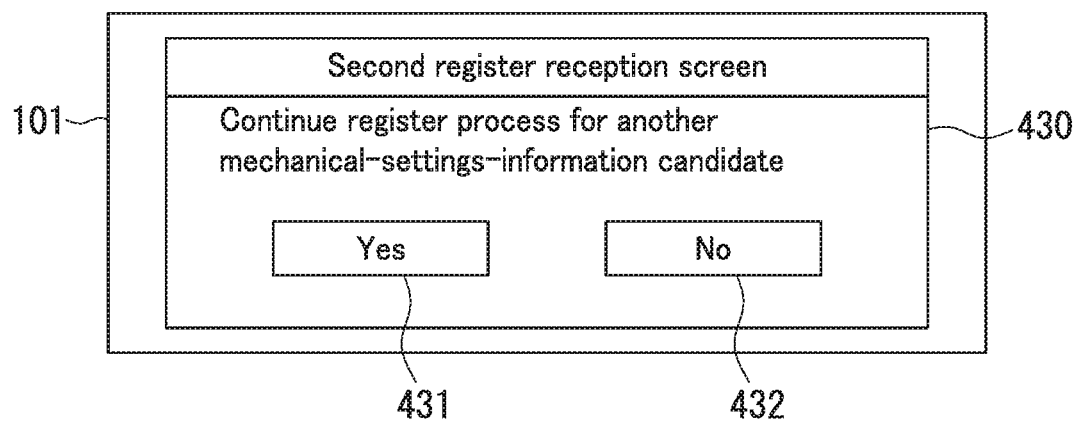
FIG. 15 illustrates a second register reception screen in the embodiment of the present disclosure.

Here, the second register reception screen 430 is described with reference to FIG. 15. FIG. 15 illustrates the second register reception screen 430 in the present embodiment. As illustrated in FIG. 15, the second register reception screen 430 includes a YES button 432 and a NO button 432. The YES button 431 is a button that allows the user to choose to further associate the image-to-be-registered as a registered image with respect to a mechanical-settings-information candidate different from the mechanical-settings-information candidate selected according to the second selection instruction. The NO button 432 is a button that allows the user to choose to end the register process. This enables the user to choose whether or not to further associate the image-to-be-registered as a registered image with respect to another mechanical-settings-information candidate different from the mechanical-settings-information candidate selected according to the second selection instruction.

At Step S209: the controller 18 determines which of the YES button 431 and the NO button 432 has been selected through the second register reception screen 430. When the controller 18 determines that the YES button 431 has been selected (L3 at Step S209), the process returns to Step S202.

When the controller 18 determines that the NO button 432 has been selected (L4 at Step S209), the process ends.

As described with reference to FIGS. 1 to 15, an image forming apparatus 100 includes an image forming section 14, a case section 121, a conveyance section 13, a controller 18, a reader section 11, and storage 17. When a sheet S is newly loaded in the case section 121, the controller 18 determines whether or not a matching image exists. Here, the matching image is a registered image matching an identification image of registered images. When determining that the matching image exists, the controller 18 adjusts mechanical settings information based on a mechanical-settings-information candidate associated with the matching image of mechanical-settings-information candidates. This enables an image-forming-apparatus body 1 to, when the sheet S is newly loaded in the case section 121, easily adjust the mechanical settings information to the mechanical settings information corresponding to the newly loaded sheet S.

As described with reference to FIGS. 1 to 15, the registered images include registered images associated with one of the mechanical-settings-information candidates. This enables the image-forming-apparatus body 1 to surely adjust the mechanical settings information by mechanical settings information corresponding to the newly loaded sheet S.

As described with reference to FIGS. 1 to 15, the reader section 11 acquires an image-to-be-registered. For example, the registered image is an image of wrapping paper of the sheet S. In this case, when the design of the wrapping paper of the sheet S is changed, the image-forming-apparatus body 1 can easily change the registered image.

As described with reference to FIGS. 1 to 15, the image forming apparatus 100 further includes a display section 101 and operation buttons 102. When determining that the matching image does not exist, the controller 18 causes the display section 101 to display the first register screen 340. The controller 18 stores, in the storage 17, the identification image as a registered image with the registered image associated with one of the mechanical-settings-information candidates based on first register information. This enables the image-forming-apparatus body 1 to easily register the identification image with the identification image associated with the mechanical settings information.

As described with reference to FIGS. 1 to 15, the reader section 11 acquires an image-to-be-registered. The operation buttons 102 allows the user to enter therethrough an instruction to the display section 101 to display a second register screen 400. The controller 18 causes the display section 101 to display the second register screen 400 based on the instruction. The controller 18 stores, in the storage 17, the image-to-be-registered as a registered image with the registered image associated with one of the mechanical-settings-information candidates based on second register information. This enables the image-forming-apparatus body 1 to easily register the registered image associated with second mechanical settings information.

As described with reference to FIGS. 1 to 15, the controller 18 causes the display section 101 to display the candidate selection screen 310 when determining that more than one matching image exist. The controller 18 adjusts the mechanical settings information based on a mechanical-settings-information candidate associated with a first selection candidate 3110 selected according to a first selection instruction. This enables the image-forming-apparatus body 1 to accurately adjust the mechanical settings information based on mechanical settings information corresponding to the newly loaded sheet S.

As above, an embodiment of the present disclosure has been described with reference to the drawings (FIGS. 1 to 15). However, the present disclosure is not limited to the above-described embodiment and can be practiced in various ways within the scope without departing from the essence of the present disclosure (for example, (1) and (2) below). The drawings mainly illustrate schematic constituent elements in order to facilitate understanding, and thickness, length, numbers or the like of each constituent element illustrated in the drawings may differ from actual ones thereof in order to facilitate preparation of the drawings. Further, the material, shape, and dimensions of each constituent element or the like described in the above embodiment is merely an example that does not impose any particular limitations and may be altered in various ways as long as such alterations do not substantially deviate from the effects of the present disclosure.

(1) As described with reference to FIGS. 1 to 15, although the image forming apparatus 100 is an inkjet printer, the present disclosure is not limited to this. For example, the image forming apparatus 100 may be an electrographic printer.

(2) As described with reference to FIGS. 1 to 15, although the controller 18 in the image forming apparatus 100 calculates a degree of similarity for each of registered images and determines that a matching image exists when a registered image whose calculated degree of similarity satisfies a predetermined condition, the present disclosure is not limited to this.

What is claimed is:

1. An image forming apparatus comprising:
   an image forming section configured to form an image on a sheet;
   a case section configured to contain the sheet;
   a conveyance section configured to convey the sheet contained in the case section to the image forming section;
   a controller configured to control the image forming section and the conveyance section according to mechanical settings information corresponding to a type of the sheet;
   an acquiring section configured to acquire an identification image for identifying the type of the sheet; and
   storage that stores therein mechanical-settings-information candidates and registered images respectively associated with the mechanical-settings-information candidates, wherein
   the controller
   determines whether or not a matching image exists when a sheet is loaded in the case section, the matching image being a registered image matching the identification image of the registered images, and
   adjusts the mechanical settings information based on a mechanical-settings-information candidate associated with the matching image of the mechanical-settings-information candidates when determining that the matching image exists.

2. The image forming apparatus according to claim 1, wherein
   the registered images include registered images associated with one of the mechanical-settings-information candidates.

3. The image forming apparatus according to claim 1, wherein
   the acquiring section acquires an image to be registered.

4. The image forming apparatus according to claim 1, further comprising:
   a first display section configured to display a first register screen for associating the identification image with one of the mechanical-settings-information candidates; and
   a first input section that allows first register information to be entered through the first register screen, the first register information being information for associating the identification image with one of the mechanical-settings-information candidates, wherein
   the controller
   causes the first display section to display the first register screen when determining that the matching image does not exist, and
   stores, in the storage, the identification image as the registered image with the registered image associated with one of the mechanical-settings-information candidates based on the first register information.

5. The image forming apparatus according to claim 1, further comprising:
   a second display section configured to display a second register screen for associating an image-to-be-registered with one of the mechanical-settings-information candidates; and
   a second input section that allows second register information to be entered through the second register screen, the second register information being information for associating the image-to-be-registered with one of the mechanical-settings-information candidates, wherein
   the acquiring section acquires the image-to-be-registered,
   the second input section allows an instruction to be entered therethrough, the instruction being an instruction to the second display section to display the second register screen,
   the controller
   causes the second display section to display the second register screen according to the instruction, and
   stores, in the storage, the image-to-be-registered with the image-to-be-registered associated with one of the mechanical-settings-information candidates based on the second register information.

6. The image forming apparatus according to claim 1, further comprising:
   a third display section configured to display a list containing selection candidates respectively corresponding to matching images as the matching image; and
   a third input section that allows a selection instruction to be entered therethrough, the selection instruction being an instruction to select one of the selection candidates in the list, wherein
   each of the selection candidates indicates classification information of the type of the sheet, and
   the controller
   causes the third display section to display the list when determining that the matching images exist, and
   adjusts the mechanical settings information based on a mechanical-settings-information candidate associated with a selection candidate selected according to the selection instruction.

7. A non-transitory computer readable storage medium storing an adjustment program for adjusting mechanical settings information in an image forming apparatus,
   the image forming apparatus including:
   an image forming section configured to form an image on a sheet;
   a case section configured to contain the sheet;
   a conveyance section configured to convey the sheet contained in the case section to the image forming section;

a controller configured to control the image forming section and the conveyance section according to the mechanical settings information corresponding to a type of the sheet; and storage that stores therein mechanical-settings-information candidates and registered images associated with the mechanical-settings-information candidates, and the adjustment program causes a computer to carry out procedures for:

determining whether or not a matching image exists when a sheet is loaded in the case section, the matching image being a registered image, matching an identification image for identifying the type of the sheet, of the registered images; and adjusting the mechanical settings information based on a mechanical-settings-information candidate associated with the matching image of the mechanical-settings-information candidates when determining that the matching image exists.

* * * * *